United States Patent [19]

Andrews

[11] 3,960,526
[45] June 1, 1976

[54] PARTICLE SEPARATING APPARATUS

[75] Inventor: John S. Andrews, Barry, Wales

[73] Assignee: H. H. Robertson Company, Pittsburgh, Pa.

[22] Filed: Dec. 20, 1974

[21] Appl. No.: 534,821

[30] Foreign Application Priority Data
Jan. 29, 1974 United Kingdom............. 4081/74

[52] U.S. Cl...................... 55/227; 55/242; 55/337; 55/431; 55/444; 55/457; 55/463
[51] Int. Cl.²........................... B01D 50/00
[58] Field of Search............ 55/227–229, 55/235, 242, 317, 321, 325, 326, 429, 431, 442–447, 457, 463, DIG. 22, DIG. 23, 421, 337

[56] References Cited
UNITED STATES PATENTS

| | | | |
|---|---|---|---|
| 62,558 | 3/1867 | Neal | 210/521 |
| 704,199 | 7/1902 | Lee | 55/228 |
| 731,953 | 6/1903 | Roberts | 55/443 |
| 773,830 | 11/1904 | Vater | 55/242 |
| 790,849 | 5/1905 | Osborne | 55/444 |
| 1,169,919 | 2/1916 | Brassert | 55/443 |
| 1,245,247 | 11/1917 | Zissaver | 55/227 X |
| 1,594,354 | 8/1926 | Cole | 55/227 |
| 1,821,842 | 9/1931 | Long | 55/429 X |
| 1,866,193 | 7/1932 | Coutant | 55/444 X |
| 2,059,673 | 11/1936 | Watson | 55/444 X |
| 2,384,414 | 9/1945 | Antrim | 55/429 X |
| 2,634,820 | 4/1953 | Andersen et al. | 55/444 X |
| 2,896,740 | 7/1959 | Drummond | 55/421 X |
| 3,173,771 | 3/1965 | Barrett et al. | 55/457 X |
| 3,181,287 | 5/1965 | Rabson | 55/443 X |
| 3,258,895 | 7/1966 | Weibe et al. | 55/457 X |
| 3,369,349 | 2/1968 | Farr | 55/442 |
| 3,686,833 | 8/1972 | Rush | 55/228 |

Primary Examiner—Frank W. Lutter
Assistant Examiner—David L. Lacey
Attorney, Agent, or Firm—Harry B. Keck; George E. Manias

[57] ABSTRACT

A gaseous stream is freed of its particulate material in apparatus which includes a casing having an inlet opening, an outlet opening, and an impingement screen disposed across the inlet opening and comprising single or multiple, preferably staggered rows of impingement elements of V-shaped transverse profile positioned with the apex thereof facing the inlet opening. As the gaseous stream flows through the impingement screen, vortices are formed at the trailing edge of each element whereby droplets in the gaseous stream are entrained into the vortices, spin into a low pressure region which exists inside the open rear of the impingement element, and drain by gravity to collecting means. A series of radially extending vanes positioned downstream of the impingement screen impart swirl to the gaseous stream. A series of coaxial frustoconical rings are provided downstream of the vanes. Support means maintain the coaxial frustoconical rings in overlapping arrangement. The action of the vanes, of the coaxial rings and of the support means on the gaseous stream enhances particle removal.

9 Claims, 6 Drawing Figures

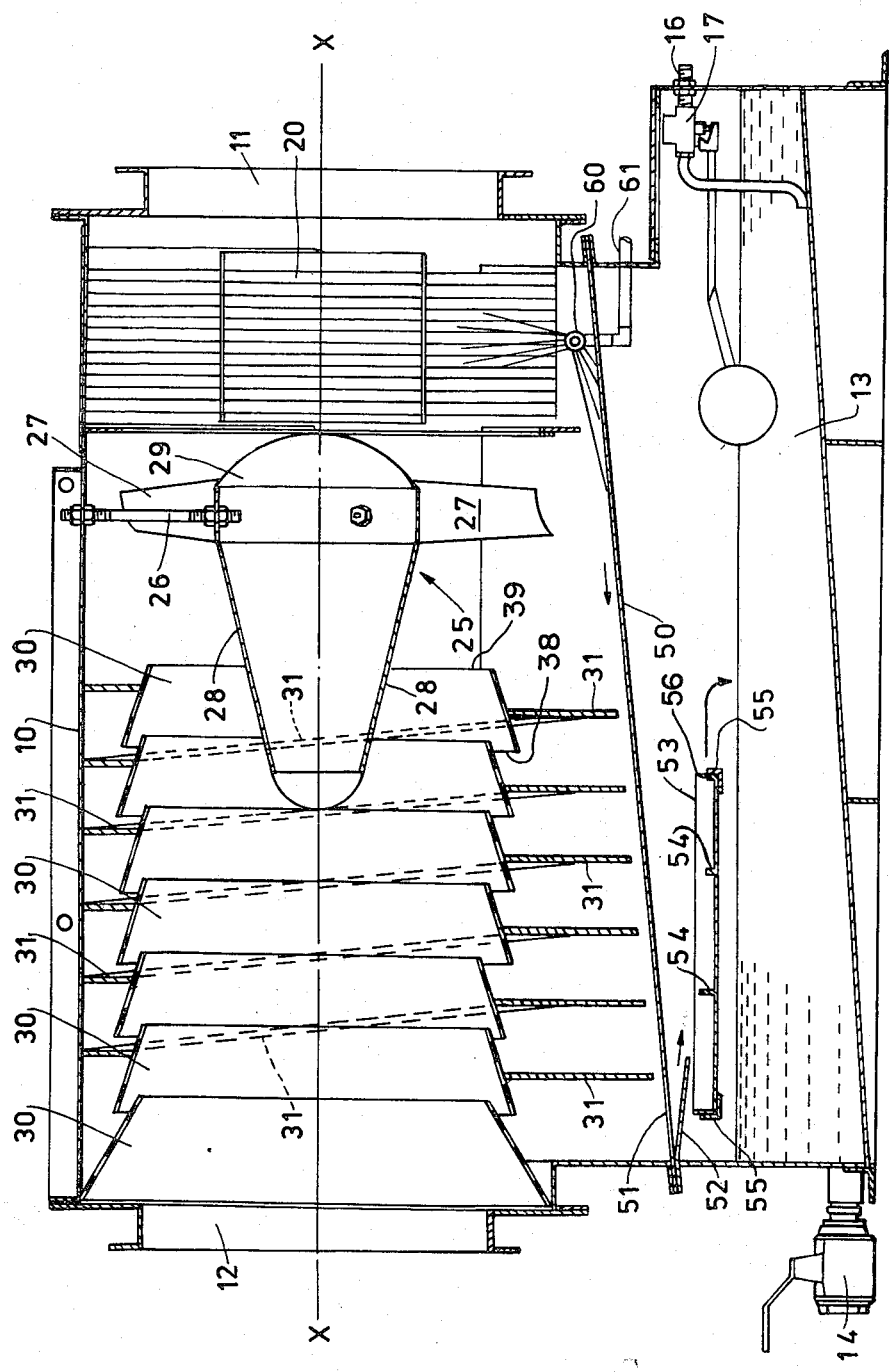

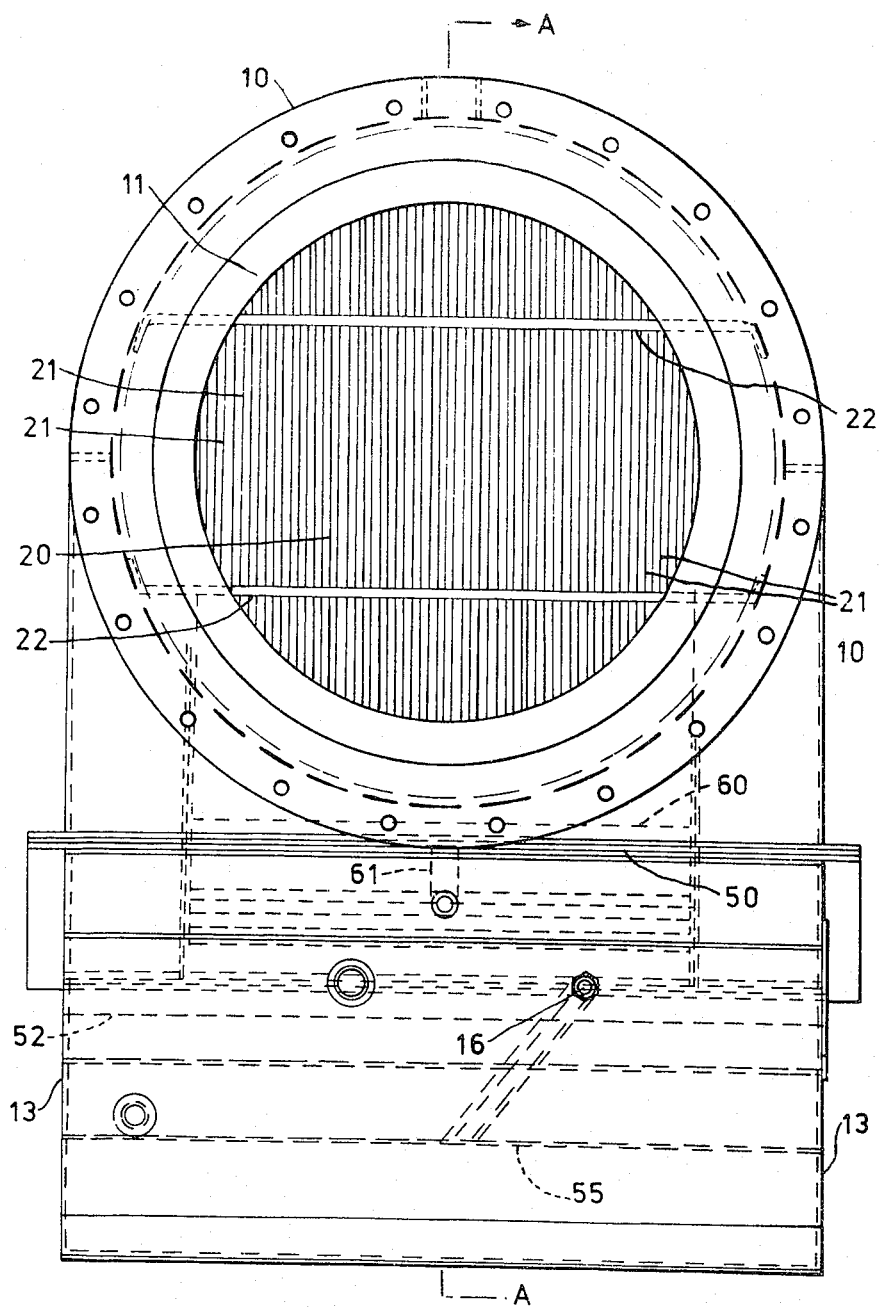

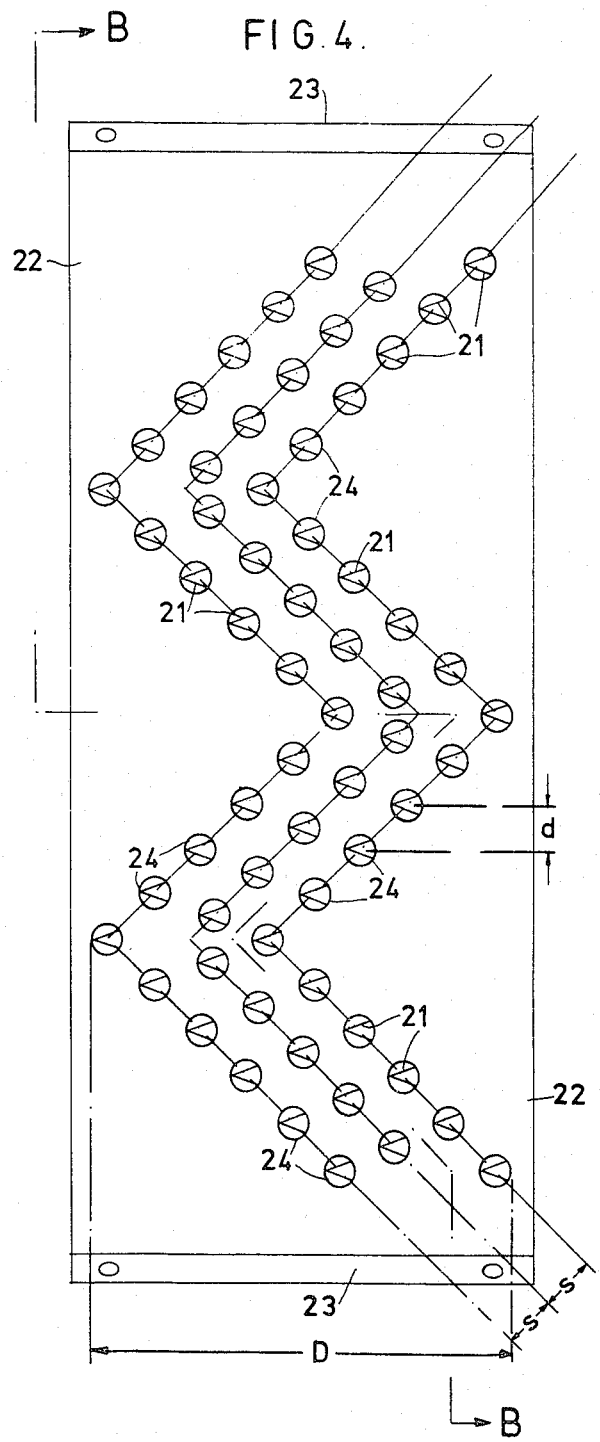
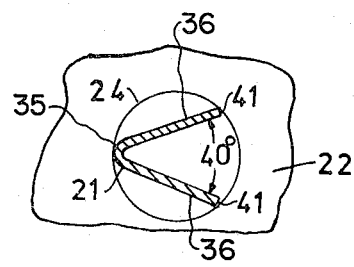

PARTICLE SEPARATING APPARATUS

BACKGROUND OF THE INVENTION

1. Field of the Invention

This invention concerns improvements in particle separating apparatus, and more particularly in apparatus for eliminating particles of dust and/or moisture from solids-laden gas streams, whereby the discharged air stream is saturated with moisture but relatively dust free.

2. Description of the Prior Art

Devices are known for removing solids from a gas stream by impingement, by centrifugal action, by cyclonic action, by inertial action, and by filtering.

SUMMARY OF THE INVENTION

Spray or mist producing devices are known which serve primarily to control the humidity of the air stream flowing therethrough. Such devices include a water spinner for producing water droplets which combine with and thereby entrap particles of dust in the air stream. The apparatus according to the present invention is designed to arrest and remove such airborne droplets and dust particles from the air flow downstream of the water spinner, whereby the discharged air stream is saturated with moisture but relatively dust free.

One object of the present invention is to provide apparatus which is compact and has a relatively low resistance to air flow.

A further object of the present invention is to provide apparatus for the above-described purpose which has no moving parts.

These are valuable features where, for example, the apparatus is to be used in mines and other confined spaces.

According to the present invention, there is provided particle separating apparatus comprising a casing defining a flow path for a gaseous stream laden with solid and/or liquid particles. The casing has a longitudinal axis, an inlet opening and an outlet opening. An impingement screen is disposed across the inlet opening and comprises a plurality of spaced-apart parallel elongated elements extending normal to the longitudinal axis of the casing. Each of the elements have a V-shaped transverse profile including an apex facing upstream and diverging sides. A sump is provided for receiving droplets and particles removed from the gaseous stream. The impingement elements may be arranged in multiple, preferably staggered, rows such that there is no rectilinear axial flow path between the elements for the gaseous stream. The angle between the sides and the width of each side of each impingement element are arranged such that as the gaseous stream flows through the impingement screen, vortices are formed at each trailing edge of the element sides whereby droplets in the gaseous stream impinging on the element become entrained in the vortices, spin into a low pressure region which exists inside the open rear of the element, and drain by gravity to the sump.

In a preferred embodiment, the casing incorporates a series of radially extending vanes disposed downstream of the impingement screen and arranged so as to impart swirl to the gaseous stream after it has passed through the impingement screen. Downstream of the vanes there may be provided a series of frustoconical rings. Support means, in the form of a helix for example, is provided for supporting the rings in coaxially aligned overlapping relation. The vanes, the coaxial rings and the support means function as a secondary separator means which aid in particle removal.

BRIEF DESCRIPTION OF THE DRAWINGS

FIG. 1 is a cross-sectional view taken along the line A—A of FIG. 2, illustrating the particle separating apparatus of this invention;

FIG. 2 is a front view of the particle separating apparatus of this invention;

FIG. 4 is a plan view of the impingement screen;

FIG. 5 is a fragmentary transverse cross-sectional view of an impingement element and its support.

DESCRIPTION OF THE PREFERRED EMBODIMENT

Figure 6:
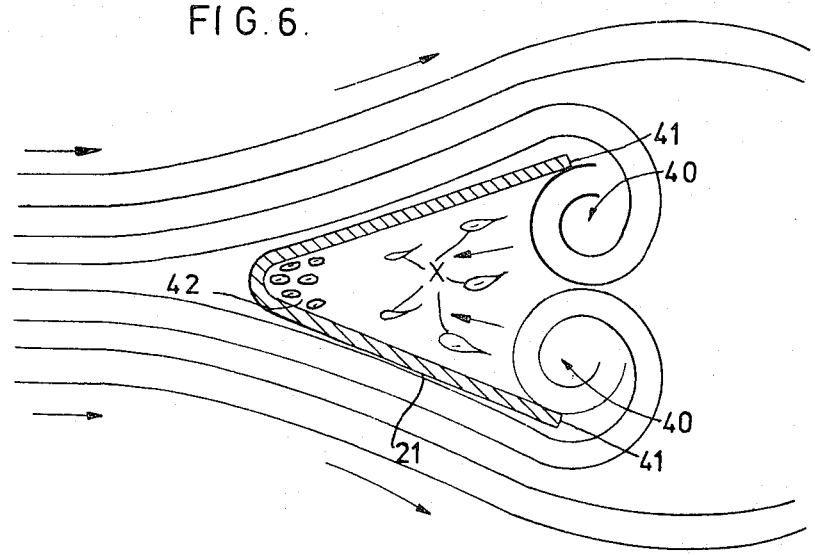
FIG. 6 is a transverse cross-sectional view of a single impingement element, schematically illustrating the flow of a gaseous medium therearound.
Figure 3:
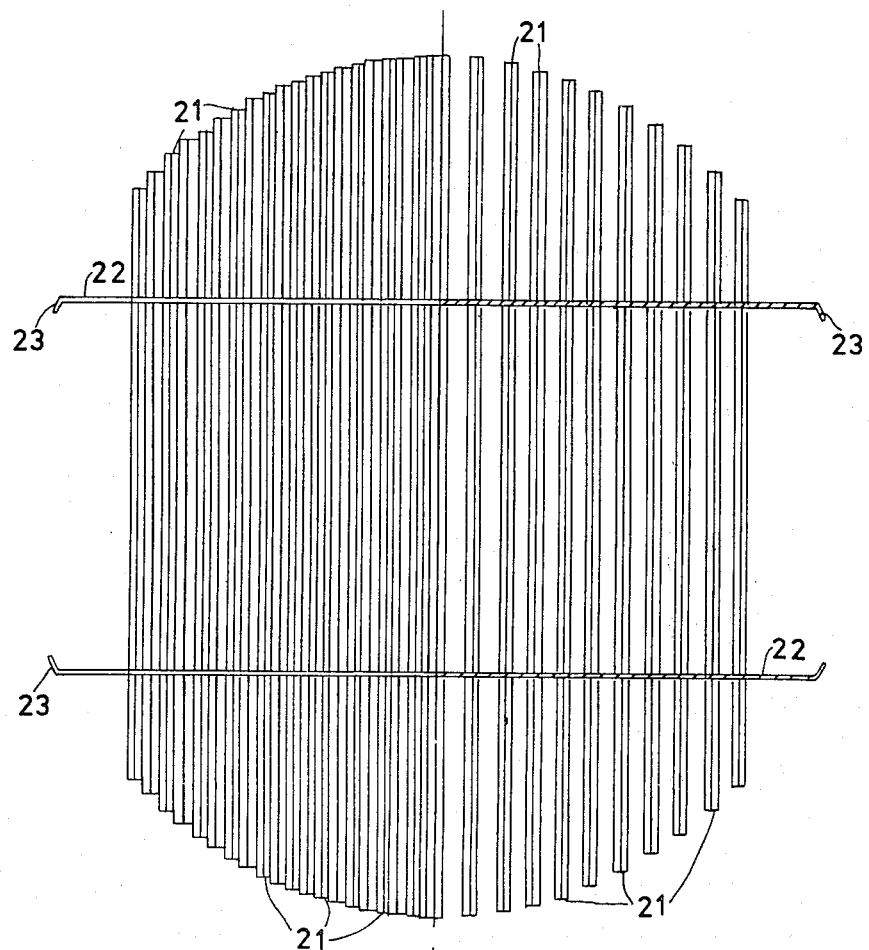
FIG. 3 is a front view of the impingement screen, partly in cross-section and as viewed from the line B—B of FIG. 4.

Referring to FIGS. 1 and 2, the present apparatus includes a tubular housing 10 having a longitudinal axis X—X. Flanged inlet and outlet openings 11, 12 provided at the opposite ends of the tubular casing 10 adapt the casing 10 for connection to duct work in an axial disposition. A sump 13 is provided at the base of the casing 10 and has a drain 14. An inspection and cleaning hatch (not illustrated) preferably is provided in the sump 13. The sump 13 is further provided with a coupling 16 to which a supply conduit (not illustrated) is connected for liquid recirculation purposes. The flow of liquid through the coupling 16 is controlled by a float operated valve 17.

Referring to FIGS. 1 through 4, an impingement screen 20 is provided within the casing 10 adjacent to the inlet opening 11. The impingement screen 20 comprises a series of elongated parallel impingement elements 21 which extend across the inlet opening 11, normal to the longitudinal axis X—X, and are supported in echelon rows. The elements 21 are supported in spaced relation by means of two spaced-apart locating plates 22 which extend across the casing 10 and have angled end portions 23 secured to the walls of the casing 10. The locating plates 22 have appropriately spaced and dimensioned apertures 24. The elements 21 extend through the apertures 24 and are secured to the locating plate 22 as by tack welding. It will be observed in FIG. 5 that the element 21 has a V-shaped transverse profile including an apex 35 and diverging arms 36 presenting trailing edges 41. The elements 21 are positioned such that the apices 35 thereof face upstream, that is, face the inlet opening 11 (FIG. 1). In the present instance, the arms 35 of each of the elements 21 diverge from the apex 35 thereof at about 40 angular degrees.

Referring to FIG. 1, an axially disposed member 25 is provided downstream of the screen 20 and is supported by radial struts 26 bolted to the casing 10. A series of fixed blades or vanes 27 extend radially from the member 25. The member 25 has a frustoconical rear fairing 28 and a convex nosepiece 29.

The downstream portion of the casing 10 also houses a further means for separating liquid droplets from the air flow, consisting of a series of frustoconical rings 30 each presenting a major opening 38 and a minor opening 39. Support means 31, in the form of a helix for example, is provided for supporting the rings 30 in coaxially aligned, overlapping relation. The rings 30 are supported with the minor openings 38 thereof facing upstream, i.e., facing the inlet opening 11.

An inclined flow plate 50 is positioned below the impingement screen 20, the member 25, and the coaxial rings 30. The flow plate 50 extends the full width of the casing 10 and slopes downwardly from the inlet opening 11 toward the outlet opening 12. Discharge apertures 51 provided at the lower end of the flow plate 50 establish communication between the interior of the casing 10 and a reversely inclined and relatively short flow plate 52 leading to a settling tray 53. The settling tray 53 is supported on angle guides 55 extending transversely of the sump 13, and is slideably removable from the sump 13 on the guides 55. The tray 53 is provided with a series of successively lower weir plates or partitions 54. The perimeter wall 56 at the downstream end of the tray 53 is lower than the lowest weir plate 54.

In operation, a gaseous stream flowing through the inlet opening 11 of the casing 10 first impinges on the screen 20. As schematically illustrated in FIG. 6, vortices 40 are formed at each trailing edge 41 of each element 21. The liquid droplets X from the gas stream are entrained in the vortices 40, spin to a low pressure zone 42 which is created within the elements 21, and drain to the sump 13.

It is to be noted that the staggered, echelon arrangement of the rows of elements 21 (FIG. 4) insures that there is no free rectilinear path for the gas stream through the screen 20. In spite of this overlapped arrangement of the elements 21, as viewed in an axial arrangement (FIG. 2), it has been found in experimental practice that there is a minimal resistance to gas flow through the screen 20.

The blades or vanes 27 (FIG. 1) downstream of the screen 20 serve to impart a swirl to the gas stream subsequent to its passage through the impingement screen 20, whereby any remaining liquid droplets in the air stream are flung outward to the walls of the casing by the centrifugal force and drain to the sump 13 via the flow plate 50 and the settling tray 53. The settling tray 53 permits the ready removal of the bulk of the solids as they are separated out. The rings 30 aided by their helical support 31 further insure a final separation whereby the gas or air emerging from the outlet opening 12 while saturated with moisture is substantially free of liquid droplets and foreign matter.

A spray nozzle 60 supplied with water by a supply conduit 61 is positioned to direct water onto the screen 20 thereby to prevent any likelihood of the screen 20 becoming choked by the deposition of solid matter on the elements 21. The spray nozzle 60 also is arranged to direct a spray of cleansing water onto the flow plate 50 thereby to prevent the settling out of solid matter thereon.

According to one embodiment of the invention which has been found satisfactory in experimental practice, the casing 10 had an axial length of 1520 millimeters. The inlet and outlet openings 11, 12 each had an internal diameter of 610 millimeters. An impingement screen 20 was provided comprising 62 of the elements 21 arranged in three echelon rows, as illustrated in FIG. 4. Each element 21 consisted of a press broken section fabricated from an 18 SWG mild steel strip. The element 21 had a V-shaped transverse profile wherein the angle between the sides thereof was 40 angular degrees. The width of each side of the element 21 was 19 millimeters. Referring to FIG. 4, the elements 21 were disposed verticaly with a spacing S between rows of 35 millimeters. The elements 21 of the first and third rows were axially aligned whereas the elements 21 of the second or intermediate row were staggered relative to the elements 21 of the first and third rows. The distance $d$ between the axes of elements of each row was 30 millimeters. The depth D of the screen 20 taking into account the echelon formation was 250 millimeters.

Apparatus so constructed and arranged had an optimum air flow of about 4 $m^3$/sec. carrying water at the rate of about 6 liters/min. The pressure drop under load was found to be only 1250 $N/m^2$. It is envisaged that the apparatus will operate in a satisfactory manner with much higher and lower volumes of air and water.

The impingement elements 21 may be constructed from materials other than metal, for example, suitable grades of hard rubber, plastics, and ceramic materials.

I claim:

1. Apparatus for separating particulate matter entrained in a gaseous stream, said apparatus including a casing having an inlet opening, an outlet opening and a longitudinal axis passing through the inlet and outlet openings; an impingement screen disposed across said inlet opening, said impingement screen comprising a plurality of impingement elements supported in spaced-apart parallel relation, normal to said longitudinal axis, each of said impingement elements having a V-shaped transverse profile including an apex confronting said inlet opening and arms diverging from said apex away from said inlet opening; a series of radially extending vanes positioned between said impingement screen and said outlet opening and arranged to impart swirl to said gaseous stream; a series of frustoconical rings positioned between said vanes and said outlet opening; support means positioned between said casing and said rings and supporting said frustoconical rings in coaxially aligned overlapping relation, said support means comprising a helix; and a sump positioned below said support means for receiving particulate matter removed from said gaseous stream.

2. The apparatus of claim 1 wherein said impingement screen includes multiple rows of said impingement elements, the impingement elements of one row being staggered relative to the impingement elements of an adjacent row whereby there is no rectilinear axial flow path between the impingement elements for said gaseous stream.

3. The apparatus of claim 2 wherein said multiple rows are of echelon form.

4. The apparatus of claim 1 wherein said sides of each impingement element diverge at an angle of about 40 angular degrees.

5. The apparatus of claim 1 wherein each frustoconical ring has a minor opening facing said vanes.

6. The apparatus of claim 1 wherein said sump includes an inclined flow plate directing said particulate matter toward said outlet opening; and a settling tray positioned beneath said flow plate for receiving said particulate matter; said settling tray including successively shorter weir plates and being removable from said sump for the disposal of particulate matter which collects thereon.

7. The apparatus of claim 6 including nozzle means for directing a liquid spray onto said impingement screen thereby to prevent buildup of particulate matter on said impingement elements; and conduit means for supplying liquid to said nozzle means.

8. The apparatus of claim 7 wherein said nozzle means also directs a liquid spray onto said flow plate to prevent a buildup of particulate matter thereon.

9. The apparatus of claim 6 wherein said sump includes a coupling adapted for connection to a conduit for liquid recirculation; and a float operated valve controlling the flow of liquid through said coupling.

* * * * *